(12) United States Patent
Beard et al.

(10) Patent No.: US 10,323,736 B2
(45) Date of Patent: Jun. 18, 2019

(54) INTEGRATED DRIVE GENERATOR WITH DISCONNECT PLUNGER

(71) Applicant: Hamilton Sundstrand Corporation, Charlotte, NC (US)

(72) Inventors: William B. Beard, Rockford, IL (US); Andrew P. Grosskopf, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/820,517

(22) Filed: Nov. 22, 2017

(65) Prior Publication Data

US 2019/0154124 A1 May 23, 2019

(51) Int. Cl.
*F01D 15/10* (2006.01)
*F16H 25/14* (2006.01)
*F16H 53/06* (2006.01)

(52) U.S. Cl.
CPC ............. *F16H 25/14* (2013.01); *F16H 53/06* (2013.01); *F01D 15/10* (2013.01)

(58) Field of Classification Search
CPC .......... F16H 25/14; F16H 53/06; F01D 15/10; F01D 15/12
See application file for complete search history.

(56) References Cited

U.S. PATENT DOCUMENTS

| | | | |
|---|---|---|---|
| 3,220,218 A * | 11/1965 | Rio | F16D 9/00 192/101 |
| 4,244,455 A | 1/1981 | Loker | |
| 4,252,035 A * | 2/1981 | Cordner | B64D 41/00 475/72 |
| 4,936,247 A * | 6/1990 | Sundstrom | B60K 23/08 116/281 |
| 4,997,072 A * | 3/1991 | Lapthorne | F16D 11/04 192/101 |
| 6,364,772 B1 * | 4/2002 | Sugden | F16D 9/02 165/96 |

(Continued)

FOREIGN PATENT DOCUMENTS

EP 3121473 A1 1/2017

OTHER PUBLICATIONS

European Search Report for EP Application No. 18207250.4 dated Mar. 14, 2019.

*Primary Examiner* — Vicky A Johnson
(74) *Attorney, Agent, or Firm* — Carlson, Gaskey & Olds, P.C.

(57) ABSTRACT

A disconnect plunger extends between a first end and a second end. A cam surface is formed on the second end, and has a cylindrical cam portion extending across the second end. The cylindrical cam portion has a location formed at a first radius about a point spaced beyond the second end relative to the first end. A first distance is defined from a second end facing surface of a cylindrical guide portion positioned intermediate the first and second end. A ratio of the first radius to the first distance is between 0.230 and 0.250. The point is spaced in a direction perpendicular to a center axis of the plunger body, and measured from the center axis by a second distance. A ratio of the second distance to the first radius is between 0.335 and 0.355. An integrated drive generator and a method of replacing a disconnect plunger are also disclosed.

20 Claims, 4 Drawing Sheets

(56) References Cited

U.S. PATENT DOCUMENTS

| | | | | |
|---|---|---|---|---|
| 2010/0283341 | A1* | 11/2010 | Grosskopf | F01D 5/026 310/78 |
| 2013/0112522 | A1 | 5/2013 | Granzow et al. | |
| 2015/0316110 | A1* | 11/2015 | Oram | F16H 1/06 74/405 |
| 2018/0287471 | A1* | 10/2018 | Vanderzyden | H02K 5/04 |

* cited by examiner

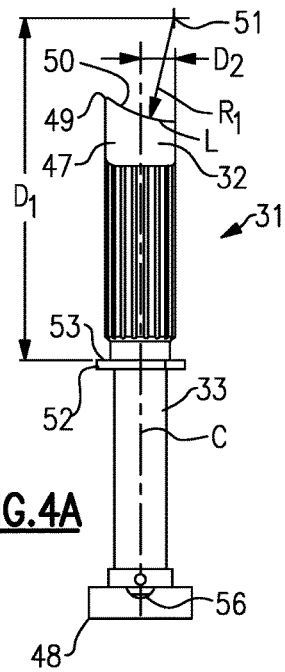
FIG.4A
FIG.4B
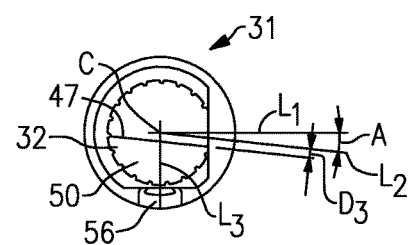
FIG.5
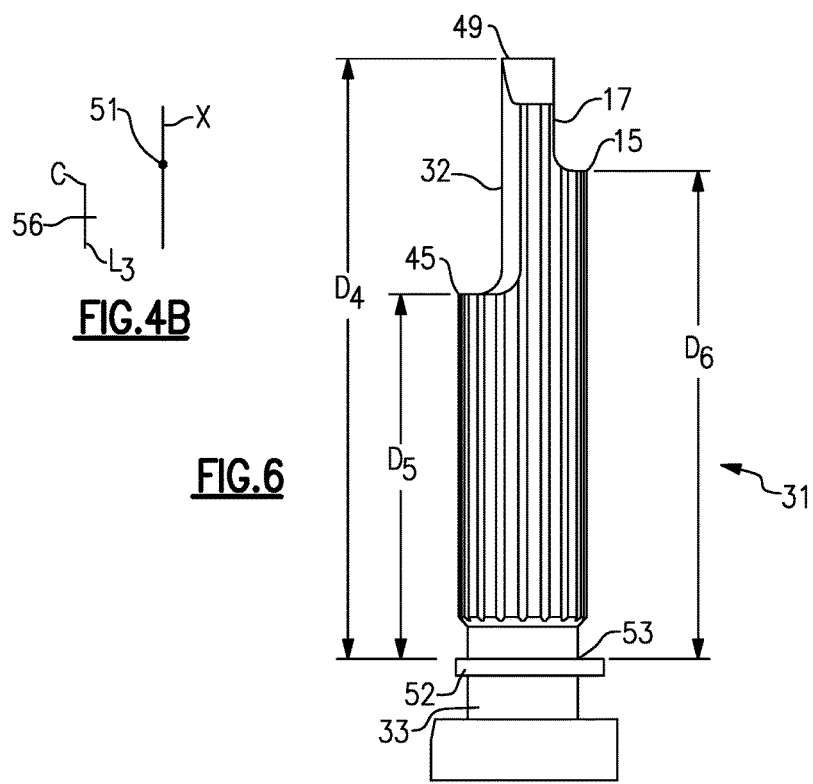
FIG.6

INTEGRATED DRIVE GENERATOR WITH DISCONNECT PLUNGER

BACKGROUND

This application relates to a disconnect plunger for use in an integrated drive generator. An integrated drive generator includes an input shaft receiving rotational drive, such as from a shaft on a gas turbine engine. The input shaft selectively drives a disconnect shaft. The disconnect shaft typically drives a generator rotor, perhaps through a differential assembly. The generator rotor rotates adjacent a generator stator to generate electricity for various uses, such as on an aircraft.

Under certain conditions, it is beneficial to not put the input shaft's rotational drive into the generator. Thus, a disconnect assembly is utilized. A disconnect assembly typically utilizes a disconnect cam profile on the disconnect shaft which is engaged with a disconnect cam profile on a disconnect plunger. The disconnect shaft is spring biased into engagement with the input shaft.

The disconnect plunger is spring biased to a first position, but a disconnect solenoid holds the disconnect plunger against this bias force.

Under certain conditions, the disconnect solenoid may be actuated to allow the disconnect plunger to bias the disconnect shaft away from engagement with the input shaft.

The disconnect plunger faces challenges in such designs.

SUMMARY

A disconnect plunger for use in an integrated drive generator includes a plunger body extending between a first end and a second end. A cam surface is formed on the second end, and has a cylindrical cam portion extending across the second end. The cylindrical cam portion has a location formed at a first radius about a point spaced beyond the second end relative to the first end. A first distance is defined from a second end facing surface of a cylindrical guide portion positioned intermediate the first and second end. A ratio of the first radius to the first distance is between 0.230 and 0.250. The point is spaced in a direction perpendicular to a center axis of the plunger body, and measured from the center axis by a second distance. A ratio of the second distance to the first radius is between 0.335 and 0.355.

An integrated drive generator and a method of replacing a disconnect plunger are also disclosed.

These and other features may be best understood from the following drawings and specification.

BRIEF DESCRIPTION OF THE DRAWINGS

FIG. 4A is another view of a disconnect plunger.
FIG. 4B shows further details.
FIG. 5 shows a further detail.
FIG. 6 shows a further detail.

DETAILED DESCRIPTION

Figure 1:
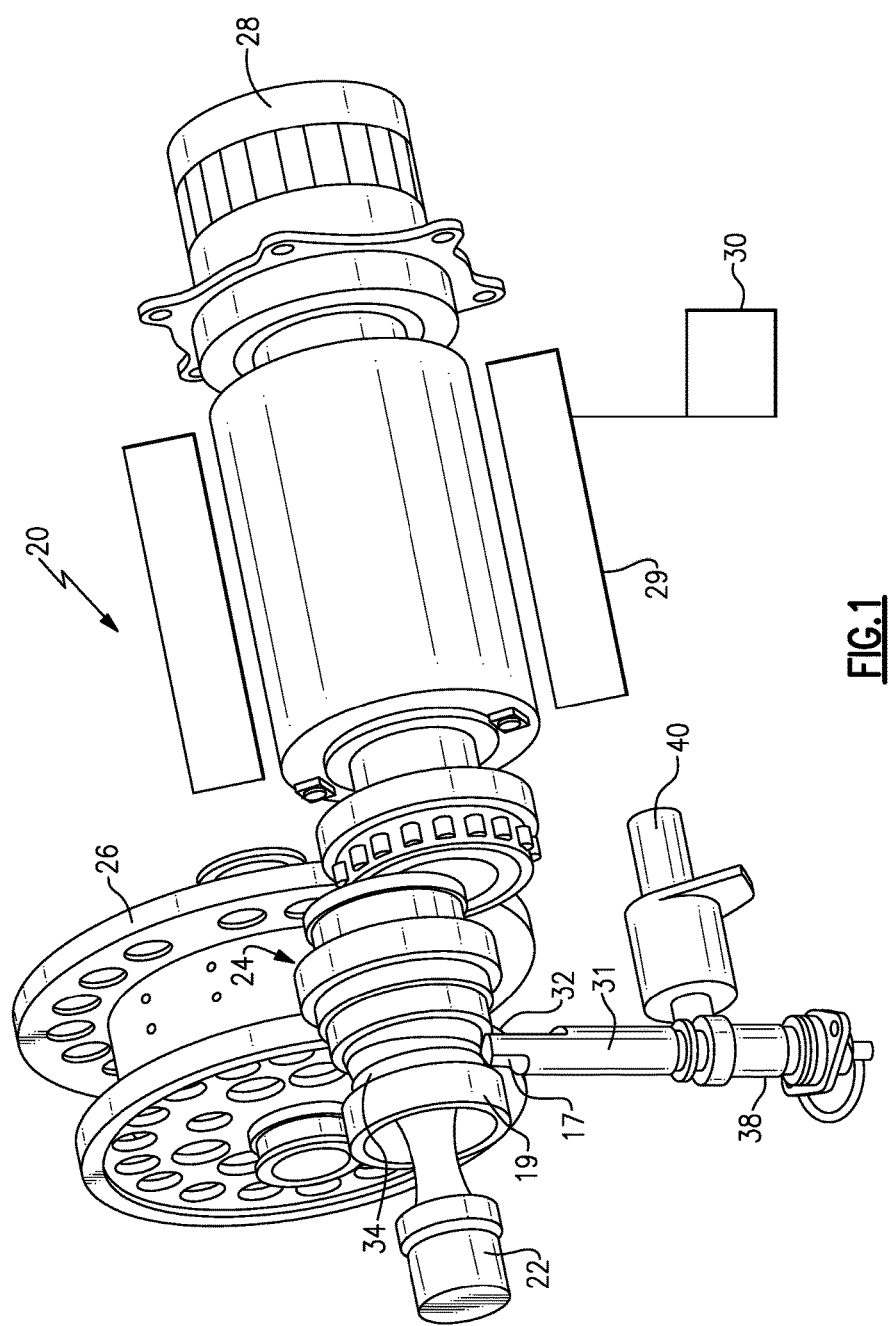
FIG. 1 schematically shows a generator.

FIG. 1 shows a generator 20 having an input shaft 22 which receives rotational drive, such as from a gas turbine engine associated with an aircraft. The input shaft selectively drives a disconnect shaft 24. A spring biases the disconnect shaft 24 into engagement with the input shaft such that rotation is transmitted. The disconnect shaft provides a drive input into a differential assembly 26 and the differential assembly 26 selectively drives a generator rotor 28. Generator rotor 28 rotates adjacent a generator stator 29 and electricity is generated for a use 30, which may be several uses on an aircraft, as an example.

A disconnect plunger 31 has a plunger cam surface 32 selectively engaging a shaft cam surface 34 on the disconnect shaft 24.

The disconnect plunger 31 has a notch (not shown in this figure) engaged by a disconnect solenoid 40. A spring 38 biases the disconnect plunger 31 toward the disconnect shaft 24. However, the disconnect solenoid 40 holds the disconnect plunger against this movement. Should it be determined that it is desirable to stop rotation from the input shaft 22 into the generator 20, then the disconnect solenoid 40 is actuated and moves away from the notch, such that the disconnect plunger 31 can move to cam disconnect shaft 24 out of engagement with the input shaft 22.

A bearing liner 19 is shown. Disconnect plunger 31 has a clearance cutout 17 to provide clearance to move past bearing liner 19.

Figure 2:
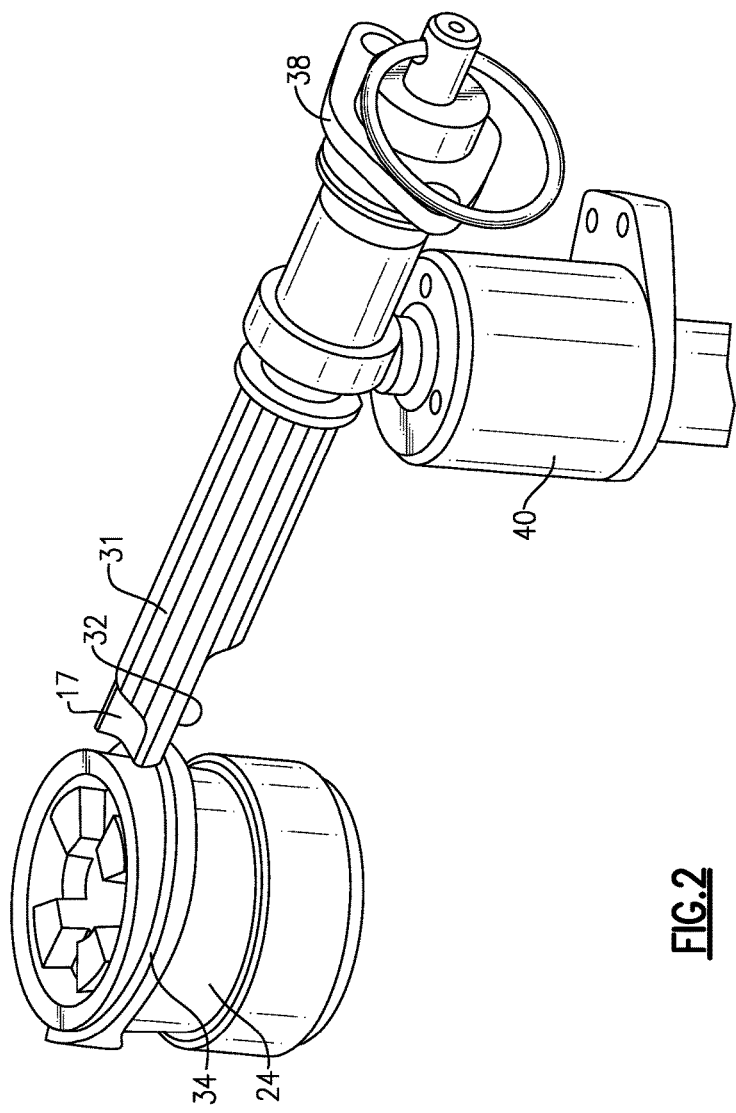
FIG. 2 shows details of a disconnect assembly.

FIG. 2 shows further details. As can be seen, the shaft cam surface 34 mates with the plunger cam surface 32 on the plunger 31. The notch receives the pin from the solenoid 40. The spring is received in a housing 38.

Figure 3:
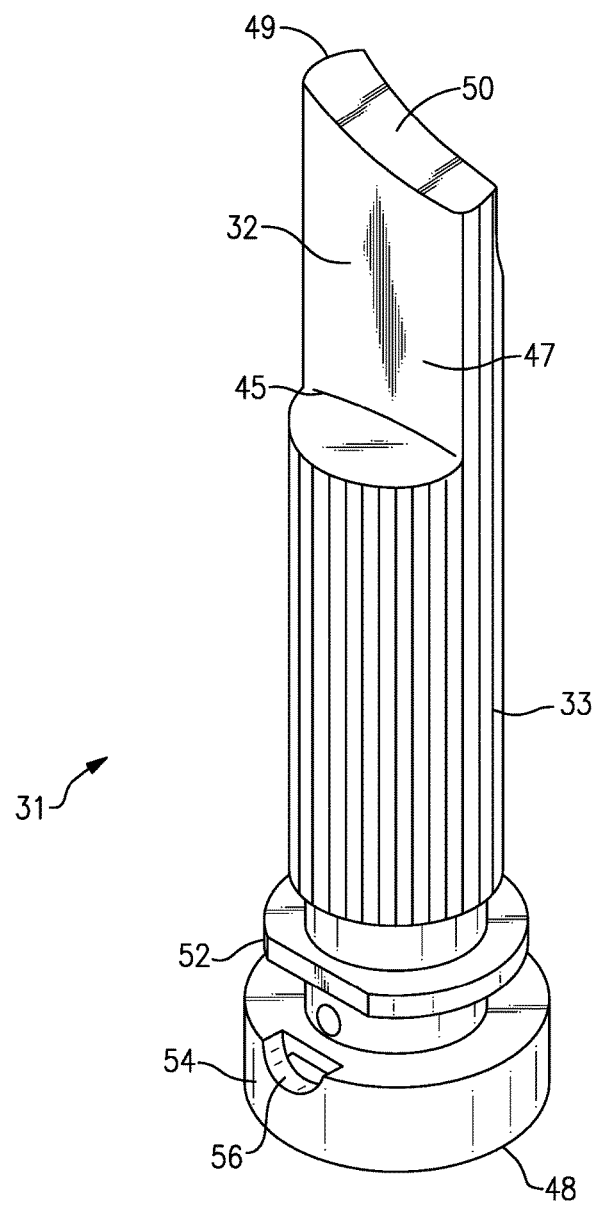
FIG. 3 shows an isometric view of a disconnect plunger.

FIG. 3 is an isometric view of a disconnect plunger 31 formed by a body 33. As can be seen, the plunger cam surface 32 extends to a cylindrical cam portion 50.

A cylindrical guide portion 52 is positioned intermediate first and second ends 48 and 49. An enlarged portion 54 extends to the first end 48 and includes the notch 56 which receives the pin from the disconnect solenoid. Cam surface 34 has an angled cam face 47 extending from an end 45 to the cylindrical cam portion 50. End 49 is the end of cylindrical cam portion 50 spaced furthest from end 48.

FIG. 4A shows further details. The cylindrical cam portion 50 has a location L formed at a radius $R_1$ from a point 51. Point 51 is spaced from a second end facing surface 53 of the cylindrical guide portion 52 by a distance $D_1$. Second end facing surface 53 faces end 49. It should be understood that $D_1$ is measured in a direction parallel to a center axis C. The point 51 is also spaced by a distance $D_2$ in a direction perpendicular to the center axis C and from the center axis C. In one embodiment, $R_1$ was 0.762 inch (1.935 centimeters). $D_2$ was 0.280 inch (0.711 centimeters) and $D_1$ was 2.79 inches (7.087 centimeters).

It should be understood that these and all dimensions disclosed should be taken with a tolerance of 0.01 inch (0.025 cm).

In embodiments, a ratio of $R_1$ to $D_1$ was between 0.230 and 0.250. A ratio of $D_2$ to $R_1$ was between 0.335 and 0.355.

The above describes how the location L is defined. However, as mentioned, the cylindrical cam portion 50 extends into the plane of FIG. 4A. As shown in FIG. 4B, the radius is utilized to define the cylindrical cam portion 50 by moving along an axis X which passes through point 51. The axis X is defined parallel from a line $L_3$ which extends from the center axis C and bisects the notch 56.

FIG. 5 shows an end view of the disconnect plunger 31. As can be seen, cam face 47 extends at an angle across the disconnect plunger 31. An angle A can be defined between a line $L_1$ and a line $L_2$. Line $L_1$ extends from the center C of the disconnect plunger 31. Line $L_1$ is also perpendicular to a line $L_3$ which extends from center point C to bisect the notch 56. Line $L_2$ is parallel to the cam face 47, but spaced from the cam face 47 by a third distance $D_3$. In essence, the angle A defines a spacing between the notch 56 and the cam face 47. In an embodiment, angle A is 6.3 degrees. In embodiments, $D_3$ is 0.052 inch (0.132 centimeter). Angle A aligns parallel with a cam face on the disconnect shaft. In embodiments, angle A is between 5.3 and 7.3 degrees. In further embodiments, a ratio of $R_1$ to $D_3$ is between 15.3 and 15.9.

FIG. 6 shows further details of disconnect plunger 31.

Cam surface 32 extends between ends 45 and 49. Clearance cut-out 17 extends between ends 15 and 49. As shown, end 45 is further from end 49 than is end 15. This allows the plunger to maintain sufficient stiffness. Clearance cut-out 17 is on an opposed side of disconnect plunger 31 relative to cam surface 32, or circumferentially spaced from cam surface 32.

A fourth distance $D_4$ is measured parallel to center axis C (see FIG. 4), from surface 53 to end 49. A fifth distance $D_5$ is measured parallel to center axis C from surface 53 to end 45. A sixth distance $D_6$ is measured parallel to center axis C from surface 53 to end 15.

In embodiments, $D_4$ was 2.79 inches (7.09 cm), $D_5$ was 1.695 inches (4.305 cm), and $D_6$ was 2.26 inches (5.74 cm). A ratio of $D_4$ to $D_5$ was between 1.60 and 1.70. A ratio of $D_4$ to $D_6$ was between 1.18 and 1.28.

A method of replacing a disconnect plunger in an integrated drive generator includes the step of removing an existing disconnect plunger from an integrated drive generator. The integrated drive generator includes an input shaft having a gear interface with a disconnect shaft. The disconnect shaft includes a shaft cam surface, and has a spring biasing the disconnect shaft to be in contact with the input shaft. The existing disconnect plunger has an existing plunger cam surface for mating with the shaft cam surface on the disconnect shaft, and for causing the disconnect shaft to be selectively moved in the spring force, and away from the input shaft.

The method also includes the step of replacing the existing disconnect plunger with a replacement disconnect plunger including a plunger body extending between a first end and a second end. A cam surface is formed on the second end. The cam surface has a cylindrical cam portion extending across the second end. The cylindrical cam portion has a location formed at a first radius about a point spaced beyond the second end relative to the first end. A first distance is defined from a second end facing surface of a cylindrical guide portion positioned intermediate the first and second end. A ratio of the first radius to the first distance is between 0.230 and 0.250. The point is spaced in a direction perpendicular to a center axis of the plunger body, and measured from the center axis by a second distance. A ratio of the second distance to the first radius is between 0.335 and 0.355.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A disconnect plunger for use in an integrated drive generator comprising:
   a plunger body extending between a first end and a second end, there being a cam surface formed on said second end, said cam surface having a cylindrical cam portion extending across said second end, and said cylindrical cam portion has a location formed at a first radius about a point spaced beyond said second end relative to said first end, and a first distance being defined from a second end facing surface of a cylindrical guide portion positioned intermediate the first and second end, and a ratio of said first radius to said first distance being between 0.230 and 0.250; and
   said point being spaced in a direction perpendicular to a center axis of said plunger body, and measured from said center axis by a second distance, and a ratio of said second distance to said first radius being between 0.335 and 0.355.

2. The disconnect plunger as set forth in claim 1, wherein an enlarged portion extends to said first end, and includes a notch to receive a solenoid plunger.

3. The disconnect plunger as set forth in claim 2, wherein an angle is defined by a first line and a second line, said second line formed parallel to a cam face on said cam surface that extends to said cylindrical cam portion, said first line being defined from a center axis of said plunger body perpendicular to a third line which extends from said center axis and bisects said notch, and said angle is between 5.3 and 7.3 degrees.

4. The disconnect plunger as set forth in claim 3, wherein a third distance is defined as a distance that said second line is spaced from said cam face, and a ratio of said first radius to said third distance is between 15.3 and 15.9.

5. The disconnect plunger as set forth in claim 4, wherein a clearance cut-out is circumferentially spaced from said cam surface, and extends from said second end to a clearance cut-out end, and said cam surface extends from said second end to a cam surface end, and said cam surface end spaced further from said second end than said clearance cut-out end.

6. The disconnect plunger as set forth in claim 5, wherein a fourth distance is defined from said second end facing surface to said second end, and a fifth distance is defined from said second end facing surface to said cam surface end, and a ratio of said fourth distance to said fifth distance is between 1.60 and 1.70.

7. The disconnect plunger as set forth in claim 6, wherein a sixth distance is defined from said second end facing surface to said clearance cut-out end, and a ratio of said fourth distance to said sixth distance is between 1.18 and 1.28.

8. An integrated drive generator comprising:
   an input shaft having a gear interface with a disconnect shaft, said disconnect shaft including a shaft cam surface, the disconnect shaft having a spring biasing said disconnect shaft to be in contact with said input shaft, and a disconnect plunger having a plunger cam surface for mating with said shaft cam surface on said disconnect shaft, and for causing said disconnect shaft to be selectively moved in said spring force, and away from said input shaft;
   said disconnect plunger includes a plunger body extending between a first end and a second end, said plunger cam surface formed on said second end, said plunger cam surface having a cylindrical cam portion extending across said second end, and said cylindrical cam portion has a location formed at a first radius about a point spaced beyond said second end relative to said first end, and a first distance being defined from a second end facing surface of a cylindrical guide portion positioned intermediate the first and second end, and a ratio of said first radius to said first distance being between 0.230 and 0.250; and
   said point being spaced in a direction perpendicular to a center axis of said plunger body, and measured from said center axis by a second distance, and a ratio of said second distance to said first radius being between 0.335 and 0.355.

9. The integrated drive generator as set forth in claim 8, wherein an enlarged portion extends to said first end, and includes a notch receiving a solenoid plunger.

10. The integrated drive generator as set forth in claim 9, wherein an angle is defined by a first line and a second line, said second line formed parallel to a cam face on said plunger cam surface that extends to said cylindrical cam portion, said first line being defined from a center axis of said plunger body perpendicular to a third line which extends from said center axis and bisects said notch, and said angle is between 5.3 and 7.3 degrees.

11. The integrated drive generator as set forth in claim 10, wherein a third distance is defined as a distance that said second line is spaced from said cam face, and a ratio of said first radius to said third distance is between 15.3 and 15.9.

12. The integrated drive generator as set forth in claim 11, wherein a clearance cut-out is circumferentially spaced from said plunger cam surface, and extends from said second end to a clearance cut-out end, and said plunger cam surface extends from said second end to a cam surface end, and said cam surface end spaced further from said second end than said clearance cut-out end.

13. The integrated drive generator as set forth in claim 12, wherein a fourth distance is defined from said second end facing surface to said second end, and a fifth distance is defined from said second end facing surface to said cam surface end, and a ratio of said fourth distance to said fifth distance is between 1.60 and 1.70.

14. The integrated drive generator as set forth in claim 13, wherein a sixth distance is defined from said second end facing surface to said clearance cut-out end, and a ratio of said fourth distance to said sixth distance is between 1.18 and 1.28.

15. A method of replacing a disconnect plunger in an integrated drive generator comprising the steps of:
removing an existing disconnect plunger from an integrated drive generator, the integrated drive generator including an input shaft having a gear interface with a disconnect shaft, said disconnect shaft including a shaft cam surface, the disconnect shaft having a spring biasing said disconnect shaft to be in contact with said input shaft, and the existing disconnect plunger having an existing plunger cam surface for mating with said shaft cam surface on said disconnect shaft, and for causing said disconnect shaft to be selectively moved in said spring force, and away from said input shaft; and cam.

16. The method as set forth in claim 15, wherein an enlarged portion extends to said first end, and includes a notch to receive a solenoid plunger.

17. The method as set forth in claim 16, wherein an angle is defined by a first line and a second line, said second line formed parallel to a cam face on said replacement plunger cam surface that extends to said cylindrical cam portion, said first line being defined from a center axis of said plunger body perpendicular to a third line which extends from said center axis and bisects said notch, and said angle is between 5.3 and 7.3 degrees.

18. The method as set forth in claim 17, wherein a third distance is defined as a distance that said second line is spaced from said cam face, and a ratio of said first radius to said third distance is between 15.3 and 15.9.

19. The method as set forth in claim 18, wherein a clearance cut-out is circumferentially spaced from said replacement plunger cam surface, and extends from said second end to a clearance cut-out end, and said cam surface extends from said second end to a cam surface end, and said replacement plunger cam surface end spaced further from said second end than said clearance cut-out end.

20. The method as set forth in claim 19, wherein a fourth distance is defined from said second end facing surface to said second end, and a fifth distance is defined from said second end facing surface to said cam surface end, and a ratio of said fourth distance to said fifth distance is between 1.60 and 1.70, and a sixth distance is defined from said second end facing surface to said clearance cut-out end, and a ratio of said fourth distance to said sixth distance is between 1.18 and 1.28.

\* \* \* \* \*